United States Patent
Darrel et al.

[11] 3,793,627
[45] Feb. 19, 1974

[54] AUTOMATIC SONIC DETECTION OF CHIPPED CUTTING TOOLS

[75] Inventors: Bernard Darrel; Paul F. Scott, both of Schenectady, N.Y.

[73] Assignee: General Electric Company, Schenectady, N.Y.

[22] Filed: June 28, 1972

[21] Appl. No.: 267,120

[52] U.S. Cl. .................. 340/267 R, 73/67, 73/104, 340/261
[51] Int. Cl. .......................................... G08b 21/00
[58] Field of Search ... 340/267 R, 261; 73/67, 71.4, 73/104

[56] References Cited
UNITED STATES PATENTS

| | | | |
|---|---|---|---|
| 2,866,301 | 12/1958 | Kowlicovitch et al. | 340/261 UX |
| 3,677,072 | 7/1972 | Weichbrodt et al. | 73/67 |
| 3,694,637 | 9/1972 | Edwin et al. | 73/67 X |
| 3,714,822 | 2/1973 | Lutz | 73/104 |

*Primary Examiner*—David L. Trafton
*Attorney, Agent, or Firm*—Donald R. Campbell; Joseph T. Cohen; Jerome C. Squillaro

[57] ABSTRACT

A cutting tool wear signal is obtained in known manner by sensing the sonic vibrations generated by the cutting action and extracting the high frequencies indicative of cutting tool wear. A chipped tool causes a rapid increase or decrease in the gradually rising averaged tool wear signal. The detection circuit detects this rapid increase or decrease with provision for rejecting the starting and stopping transients in the tool wear signal. The system is compatible with sonic detection of an excessively worn cutting tool.

10 Claims, 5 Drawing Figures

3,793,627

AUTOMATIC SONIC DETECTION OF CHIPPED CUTTING TOOLS

BACKGROUND OF THE INVENTION

This invention relates to a system for the automatic detection of cutting tool chipping and breakage during machining operations, and more particularly to the detection of chipped cutting edges by sonic techniques in an automated machine tool system.

The condition of the cutting tool edge is of primary importance in all machining operations. There are two major problems which always occur in the maintaining of a correct edge. First, the cutting edge wears continuously so that a continually changing offset is needed in order to maintain correct workpiece dimensions. Second, the cutting edge sometimes chips partially or breaks away completely in which case it should be replaced immediately. These problems are especially important in automated machining operations where no operator is present. Much work has been directed toward the development of highly wear resistant cutting tools which minimizes the requirement of the changing offset requirement. However the wear resistant cutting tools are brittle and therefore usually fail through breakage or chipping rather than excessive wear. In particular, several new types of ceramic cutting edges are prone to this failure pattern.

The automatic detection of excessive tool wear by sonic techniques is described in U.S. Pat. No. 3,548,648 granted to Bjorn Weichbrodt and Stephen E. Grabkowski on Dec. 22, 1970, and assigned to the same assignee as the present invention. The system herein disclosed provides an automatic indication of cutting tool chipping and breakage in a manner compatible with the sonic detection of worn cutting tools, or that can be used independently. The combination of the two in an automatic machine tool control system provides a totally automatic cutting edge condition monitoring system for automated machining operations.

SUMMARY OF THE INVENTION

In accordance with the invention, an averaged cutting tool wear signal is generated in known manner by sensing the vibrations of a cutting tool during the machining operation and extracting from the vibration signal the higher frequency components (typically between 4 and 8 kHz) indicative of tool wear. The averaged tool wear signal has a slowly increasing amplitude with greater tool wear, and also a fast rising starting transient and a fast falling stepping transient. The underlying principle of the sonic detection of chipped cutting tools is that there is a rapid increase of decrease in the slowly changing averaged tool wear signal caused by chipping that results in a duller or sharper new cutting edge. In an electronic circuit for detecting this rapid increase and decrease in signal level, it is necessary to reject the starting and stopping transients in the average tool wear signal, which occur at the start and end of each machining pass, as well as other random transients to prevent a false chipped tool output signal.

In the embodiment described, first and second chipped tool detection circuit sections are operative in parallel to respectively detect the rapid increase and rapid decrease in the averaged tool wear signal level. Both detection circuits have provision for rejecting any portion of the starting and stopping transients below a preselected adjustable threshold level. The second detection circuit further includes a delay between the occurrence of a rapid decrease in the averaged tool wear signal and the production of a chipped tool output signal sufficient for the normal stopping transient in the averaged tool wear signal to decay below the threshold level. The amplitude of the rapid increase or decrease that generates an output signal is also adjustable. In an automated machine operation, the output signal initiates retraction of the broken cutting tool so it can be replaced.

DESCRIPTION OF THE PREFERRED EMBODIMENT

Figure 2:
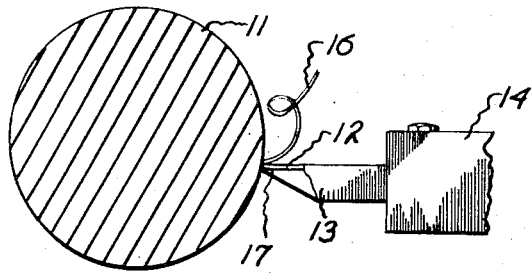
FIG. 2 is a fragmentary cross section of the workpiece and a side view of the cutting tool insert and holder illustrating the condition of a partially worn cutting edge.
Figure 1:
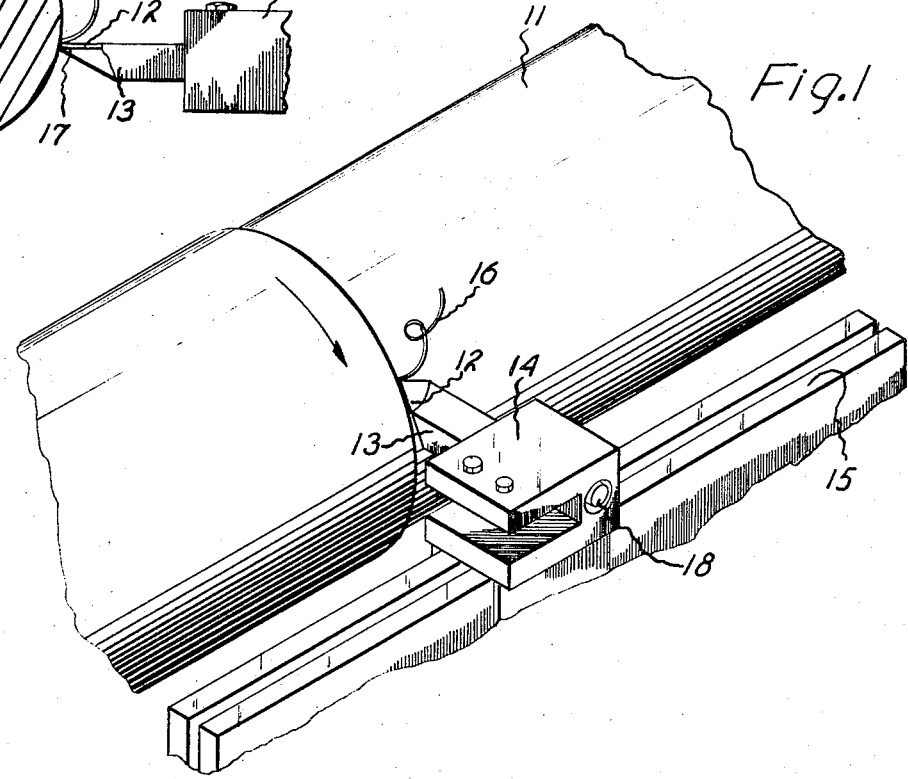
FIG. 1 is a fragmentary perspective view of a rotating workpiece being machined by a cutting tool that produces sonic vibrations sensed by a transducer mounted on the tool holder assembly.

In FIG. 1 is shown a portion of a metal workpiece 11 rotating in the direction indicated by the arrow and being machined by the cutting edge of a cutting tool insert 12. Although the invention is here illustrated by way of example in connection with a lathe for turning round stock to a desired diameter, it is applicable to a variety of other machine tools such as milling machines, planers, etc. The replaceable cutting tool insert 12 is secured to the front end of a tool holder 13 which in turn is clamped to a tool holder post 14. This cutting tool and tool holder assembly is attached to a pair of parallel guideways 15 in a machine tool with provision for advancing the cutting tool toward the workpiece and retracting it from the workpiece to adjust the depth of cut and to bring the cutting tool into and out of engagement with the workpiece. Cutting tool 12 is also movable along the axis of the workpiece in the feed direction as the machining operation proceeds.

The cutting action causes sonic vibrations to be generated at the cutting edge of cutting tool 12 and these vibrations propagate through the cutting tool and tool holder assembly and adjacent portions of the parallel guideways 15 much in the same manner as sound waves in a room. The sonic vibrations produced at the cutting edge as a source of sound propagate through the cutting tool 12, tool holder 13, and tool holder post 14, being additionally reflected at the boundaries and interfaces of these parts. As is explained in greater detail in the previously mentioned U.S. Pat. No. 3,548,648, the sonic vibrations generated at the interface of a sharp cutting edge and the workpiece are different from the vibrations generated at the interface of a worn cutting edge and the workpiece. A sharp cutting edge on cutting tool 12 generates vibrations caused by the formation and fracture of chips 16 during the machining operation as metal is removed from the surface of the workpiece. As the cutting edge wears, a flattened wear land 17 is produced at the cutting edge so that the greater contact area of the worn cutting edge generates additional vibrations caused by sliding contact with the workpiece. More particularly, it is found that the high frequency energy content of the sonic vibrations continually increases as the cutting tool wears and the wear land 17 becomes larger. The familiar squeal or screech is aural evidence of excessive wear in a cutting tool.

Figure 3:
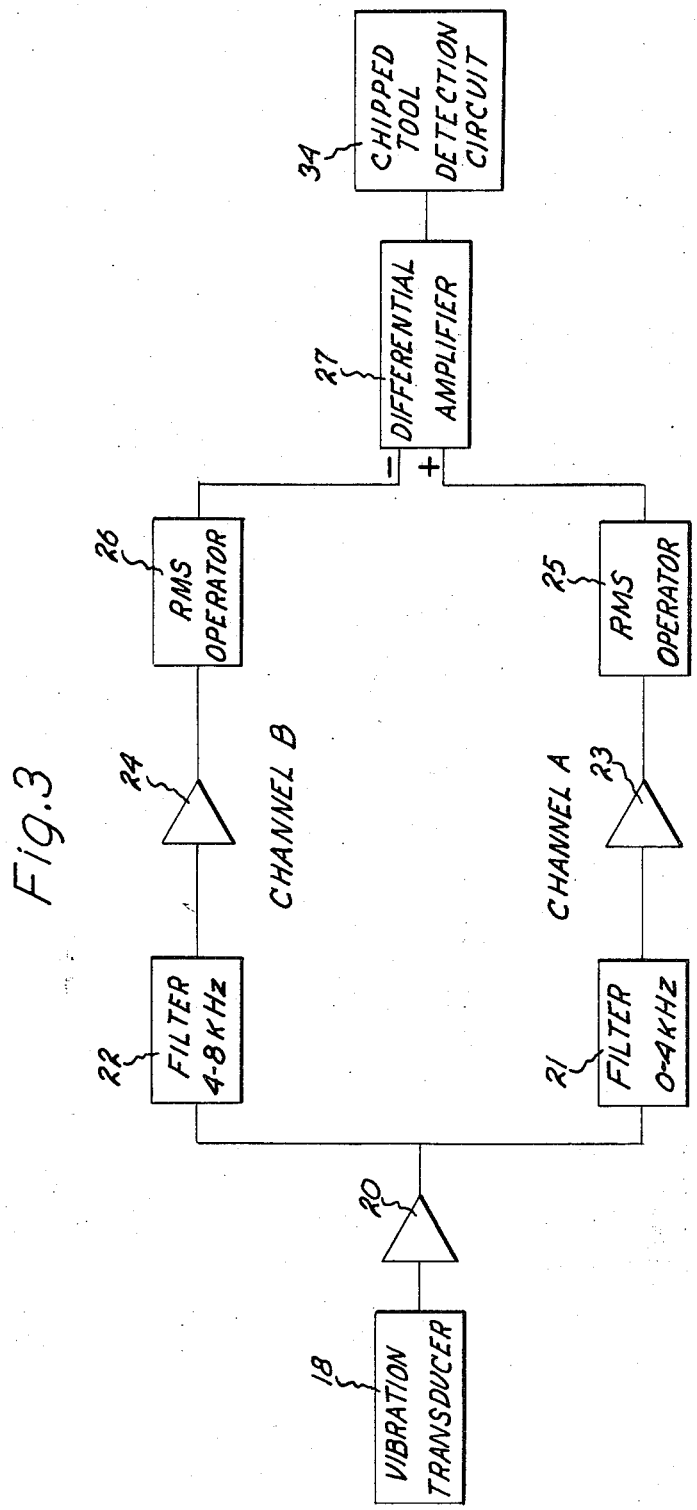
FIG. 3 is a block diagram of an electronic control system for processing the information sensed by the sonic vibration transducer to automatically detect chipped cutting edges.

The sonic vibrations generated in the cutting tool and tool holder assembly by the cutting action are sensed by a suitable vibration transducer 18 (FIG. 1). A piezoelectric accelerometer or other appropriate vibration transducer is mounted on tool holder post 14 or some other convenient location close to the cutting point. A preferred circuit technique for processing the vibration signal from vibration transducer 18 to obtain an electrical output indicative of the amount of cutting tool wear is illustrated in block diagram form in FIG. 3. This technique is based on dividing the sonically derived vibration energy into a low frequency component and a high frequency component. The vibration signal is conducted to a preamplifier 20, and then in parallel to two different filter channels each extracting certain portions of the selected frequency range. Channel A is a reference channel. It is comprised by a bandpass filter 21 for extracting the low frequency component of the vibration signal, typically 0–4 kHz. This band contains mostly machinery background noise and some noise from the machining operation. The frequency range extracted by filter 21 does not normally contain the resonant frequencies of the cutting tool and tool holder assembly system. The low frequency signal component output from filter 21 is amplified by a suitable amplifier 23 and is then fed to a RMS operator 25. The output of the RMS operation is a signal representing the root-mean-square level of the measured vibration signal in the frequency range of 0– 4 kHz or some portion of this range.

Channel B extracts and processes the high frequency component of the vibration signal, typically 4–8 kHz or a portion thereof. In similar fashion, it is comprised by a bandpass filter 22 for the higher frequency range, an amplifier 24, and a second RMS operator 26. This frequency range also contains some background machinery noise, but more importantly contains the high frequency sonic information indicative of cutting tool wear. In this frequency range are the major resonant frequencies of the cutting tool and tool holder system excited by the friction of the cutting edge rubbing on the workpiece. The two root-mean-square signals from channel A and channel B are supplied to a differential amplifier 27, whose output is the difference between the two signals. This difference increases continuously as the cutting edge wears, and represents the signal used as a cutting edge wear indicator in the sonic worn cutting tool detection system described in U.S. Pat. No. 3,548,648. The use of reference channel A is not essential to the practice of this invention. The reference input to differential amplifier 27 can be a fixed voltage representative of an average noise level. Alternatively, only channel B can be used since this channel contains substantially all the sonic high frequency information indicative of cutting edge wear. In this case, differential amplifier 27 is replaced by a simple amplifier. The high frequency component range although given by way of illustration as 4–8 kHz can have other band limits as may be determined for the particular application. It is only necessary to extract those frequencies that give a valid, continually increasing indication of the magnitude of cutting tool wear.

The underlying principle of the automatic detection of chipped and broken cutting tool edges by sonic techniques is that there is a rapid increase or decrease in the cutting tool wear signal when the cutting edge chips away. The edge of the cutting tool can chip partially, such as a corner, or completely, in which case it is said that the tool is broken. In the following discussion and in the claims, partially chipped or completely chipped or broken tools are referred to as a chipped tool. It is appreciated that cutting tools and cutting tool inserts are made in a variety of shapes, such as triangular, square, round, bevelled, etc. When a cutting tool chips, the new cutting edge appears either as a sharp edge or as a very dull one. This new edge causes a very poor machining finish, incorrect dimension of the workpiece, or both. Therefore, the cutting tool should be replaced immediately.

Figure 4:
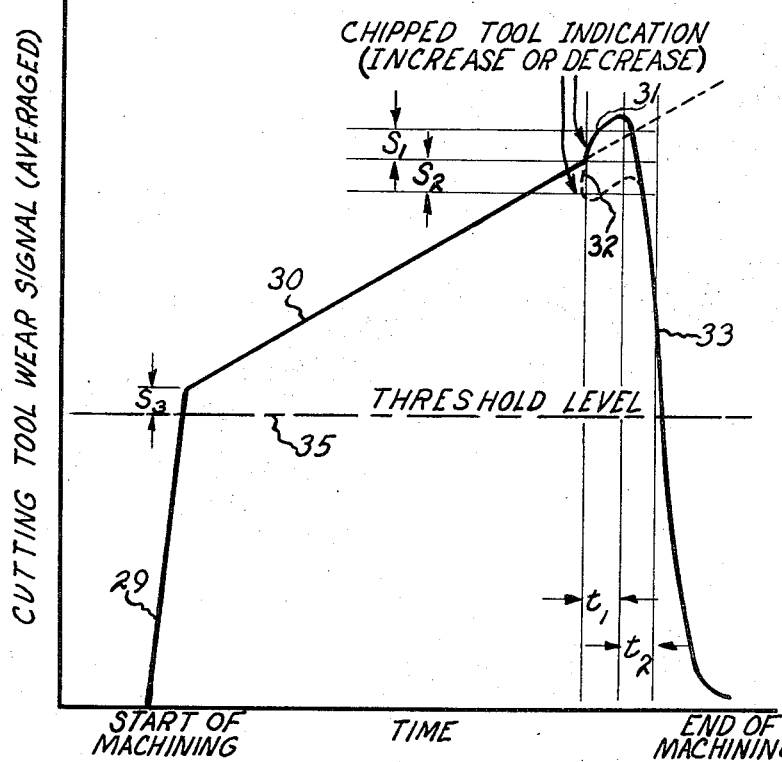
FIG. 4 shows the normal cutting tool wear signal plotted with respect to time, and the deviations therefrom caused by a chipped cutting edge that produces a rapid increase or decrease in the tool wear signal.

The cutting tool wear signal that is obtained, and the effect upon the cutting tool wear signal produced by the chipping of the cutting tool, are illustrated in FIG. 4, in which an exemplary average cutting tool wear signal is plotted with respect to time. It is necessary to integrate or average the output signal of differential amplifier 27 (FIG. 3) because there are variations in the factors determinative of tool wear and it is desired to prevent small random transients from producing a false output indication of a chipped tool or an excessively worn tool. At the start of machining, the cutting tool wear signal is characterized by a starting transient 29. The fast rising, slanting, starting transient is explained by the initial light cut of the cutting tool and other considerations including the starting transients of the sonic vibrations themselves. The amplitude of the normal cutting tool wear signal shown at 30 increases gradually as the cutting tool wears and is nominally represented as a linear function. In the absence of a chipped tool, the average tool wear signal would increase linearly as shown by the dashed line until its amplitude is large enough to trigger an excessive worn tool output indication. A chipped cutting edge results in a sudden change in the tool wear signal. The rapidity of the change is much faster than that caused by ordinary wear. A rapid increase 31 in the averaged tool wear signal is the indication of chipping that creates a new duller cutting edge, while a rapid decrease 32 in the averaged tool wear signal is the indication of chipping that creates a sharper edge. The fast decline in the tool wear signal at the end of the machining is the stopping transient 33, which is produced at the end of a normal cut or upon the retraction of cutting tool due to a chipped tool indication or an excessive worn tool indication. In order for the chipped tool detection circuit shown in detail in FIG. 5 to operate properly, it is necessary to reject or inhibit the steeply sloped starting transient 29 and stopping transient 33. Some of the other system parameters needed to understand the operation of the chipped tool detection circuit are shown in FIG. 4. The voltage signal level 35 indicates a threshold level above which it is possible to produce a chipped tool output indication. Conversely, no chipped tool indication is produced when the averaged tool wear signal level is below this threshold value. The minimum rapid change in the upward direction to produce a chipped tool indication is designated as the up-chip differential $s_1$, while the corresponding down-chip differential is designated as $s_2$. The signal voltage differentials $s_1$ and $s_2$ need not be equal, but in any case $s_1$ must be greater than the voltage level $s_3$ which represents the difference between the threshold voltage level 35 and the initial value of the normal tool wear signal 30 at the conclusion of the starting transient 29. The circuit delay time $t_1$ is nominally measured from the time at which the chipped tool indication in the tool wear signal occurs. This delay should be at least as long as the interval $t_2$, i.e., long enough for the voltage level of the tool wear signal during stopping transient 33 to decay below the threshold level 35.

Figure 5:
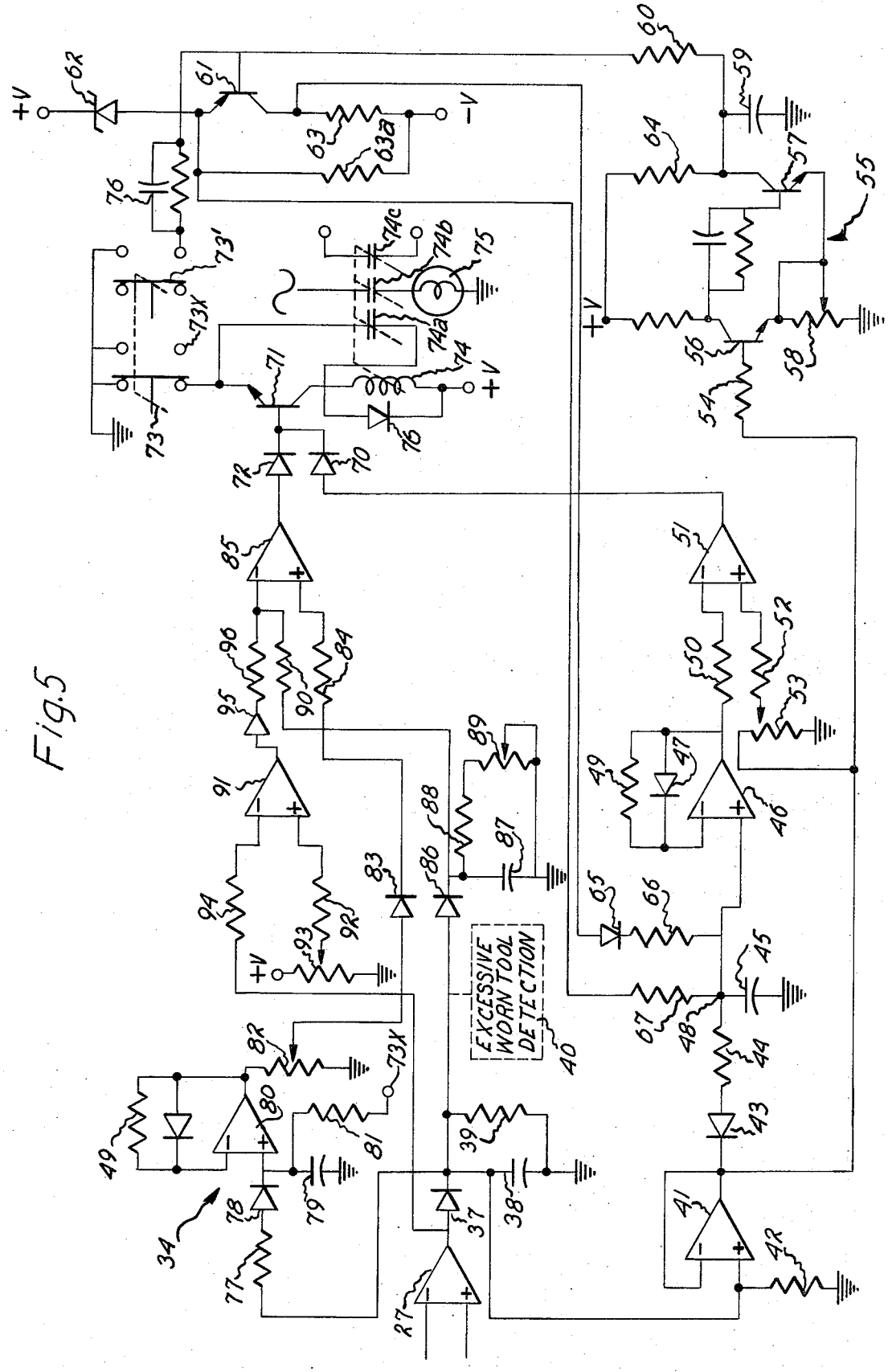
FIG. 5 is a detailed circuit diagram of the logic for detecting and generating an output indication of chipped cutting tools.

The chipped tool detection circuit 34 shown in detail in FIG. 5 is preferably implemented using integrated circuit and solid state components, but the same circuit functions can of course be obtained with other types of components or equivalent logic. The output of differential amplifier 27, which is the instantaneous cutting tool wear signal, is conducted through a diode 37 and applied to a storage capacitor 38 to obtain the average cutting tool wear signal. The averaging time depends on such considerations as the metal being machined, the type of cutting too, the speed of rotation of the workpiece, the feed rate, the depth of cut, etc. Although not illustrated, several storage capacitors can be provided with a suitable selector switch, each with a different integrating time to be selected during the machine set-up. A discharge resistor 39 is connected across storage capacitor 38. The averaged cutting tool wear signal can optionally be supplied to an excessive worn tool detection circuit 40 as taught in U.S. Pat. No. 3,548,648, with which the present chipped tool detection circuit is compatible. The section of the electronic circuit logic for detecting the rapid increase 31 in the wear signal is explained first. The averaged cutting tool wear signal is applied to the non-inverting input terminal of a high input impedance voltage follower circuit 41 provided by a suitably connected operational amplifier. For this purpose, a large resistor 42 is connected between the non-inverting input and ground, and there is 100 percent feedback from the output to the inverting input terminal. The output of follower 41 is at a low impedance level and faithfully follows changes in the voltage level at the non-inverting input terminal. The averaged cutting tool wear signal with substantially the same voltage level is conducted through a diode 43 and a resistor 44 to a control capacitor 45 after the threshold level is reached.

The voltage on control capacitor 45 is the input voltage to a second high input impedance voltage follower 46. As is explained in detail later, during the interval of the starting transient 29, the voltage on control capacitor 45 is relatively high, and thereafter drops and closely approximates the gradually increasing normal cutting tool wear signal 30. Voltage follower 46 is also an operational amplifier with the difference that the feedback path includes a diode 47 to counter-balance the diodes in the inputs to the summing junction 48, and a parallel resistor 49 that is operative at low levels where the mismatch is most pronounced. The output of follower 46 is fed through a resistor 50 to the negative input terminal of a suitable comparison amplifier 51. The positive input terminal of comparator 51 is coupled through a resistor 52 and a potentiometer 53, functioning as an attenuator, to the output terminal of the first voltage follower 41. Comparator 51 produces a chipped tool output signal, resulting from a rapid increase in the cutting tool wear signal, only when the voltage level at the negative input terminal is less than the reference voltage at the positive input terminal.

To prevent a false chipped tool output signal during the starting transient 29 of the cutting tool wear signal, comparator 51 is inhibited so long as the tool wear signal voltage is below the threshold level 35. To this end, the averaged tool wear signal at the output of follower 41 is also supplied through a resistor 54 to a Schmitt trigger 55 which senses a variable input d-c level. This bistable trigger circuit includes a pair of transistors 56 and 57 that are energized by a source of voltage +V and cross-connected such that transistor 56 is non-conducting and transistor 57 is conducting when the d-c input voltage level is below a value determined by the variable emitter resistor 58 associated with both transistors. Adjustment of variable resistor 58 by the machine operator sets the threshold voltage level 35. So long as the averaged tool wear signal applied to the base of transistor 56 is below the threshold value, transistor 57 is conducting and keeps the voltage on a capacitor 59 at a relatively low level. Capacitor 59 is connected between ground and the collector of transistor 57, and is also coupled through a resistor 60 to the base of a p-n-p control transistor 61. The emitter of control transistor 61 is connected to a Zener diode 62 and a source of voltage +V, while the collector is connected to a resistor 63 and a source of voltage −V. A resistor 63a is also connected directly between the emitter and −V. When the tool wear signal is below the threshold level 35, the voltage on capacitor 59 is low and control transistor 61 is conducting. But when the tool wear signal crosses the threshold level, the trigger changes state such that transistor 56 is rendered conducting and transistor 57 non-conducting, so that capacitor 59 now charges through a resistor 64 to a relatively high voltage thereby biasing control transistor 62 to the non-conducting condition.

Control transistor 61 is coupled with control capacitor 45 at the non-inverting input of the second voltage follower 46, and effects charging of control capacitor 45 to a relatively high voltage during most of the interval of the starting transient 29. For this purpose, the collector of control transistor 61 is connected through a diode 65 and relatively small resistor 66 to the non-inverting input terminal of follower 46. Thus, control capacitor 45 charges rapidly so long as control transistor 61 is conducting. The voltage on control capacitor 45 is held to the voltage supplied by Zener diode 62, typically 10 volts. The emitter of control transistor 61 is also coupled to a relatively large resistor 67 connected in series with control capacitor 45, thereby providing a second charging path with a long time constant when control transistor 61 is turned off. Thus, when the threshold lever 35 is exceeded and control transistor 61 turns off, control capacitor 45 discharges through resistor 44 and diode 43. The voltage on control capacitor 45 thereafter gradually increases as the averaged tool wear signal at the output of follower 41 increases.

The operation of the portion of the chipped tool detection logic for detecting a rapid increase 31 in the averaged cutting tool wear signal at least as great as the up-chip differential $s_1$ will be reviewed. The instantaneous cutting tool wear signal at the output of differential amplifier 27 is averaged by a suitably chosen storage capacitor 38. The averaged cutting tool wear signal is supplied to a high input impedance voltage follower 41, and at the start of the machining operation or pass has a low value below the threshold level 35. When the output of follower 41 is low, transistor 56 in Schmidtt trigger 55 is turned off while transistor 57 is turned on. With transistor 57 conducting, the voltage on capacitor 59 is low with the result that control transistor 61 is also conducting. Consequently, control capacitor 45 at the input of the second voltage follower 46 charges very rapidly through diode 65 and resistor 66 to a voltage level effectively determined by Zener diode 62. The high voltage on control capacitor 45 is transmitted by follower 46 to the negative input of comparator 51. Meanwhile, the averaged tool wear signal at the output of follower 41 is attenuated by potentiometer 53 and applied to the positive input of comparator 51. Since the negative input of comparator 51 is much larger than the positive input, the output is zero and no chipped tool output signal occurs.

After the averaged tool wear signal crosses the threshold lever 35, adjusted by variable resistor 58, transistor 56 turns on and causes transistor 57 to turn off. Capacitor 59 now charges to a high voltage level through resistor 64 and effects turn-off of control transistor 61. With control transistor 61 turned off, control capacitor 45 at the input of voltage follower 46 can no longer charge rapidly through diode 65 and resistor 66. The voltage at summing junction 48 drops as control capacitor 45 discharges through resistor 44 and diode 43 until the voltage is equal to that at the output of voltage follower 41. At this point the voltage at the output of follower 46 is approximately equal to the averaged tool wear signal value at the output of follower 41. However, potentiometer 53 lowers the voltage at the positive input of comparator 51, causing its output to be zero. As the averaged tool wear signal slowly rises due to gradual wearing of the cutting tool, the voltage at the output of follower 41 rises. The voltage on control capacitor 45 at the summing junction 48 slightly lags this value because of the charging time constant of the series connected resistor 67 and capacitor 45. The small voltage differential due to lag is less than the attenuation of potentiometer 53, so that the output of comparator 51 remains at zero. When the averaged cutting tool wear signal at storage capacitor 38 increases by at least the up-chip differential $s_1$ due to a chipped cutting tool, follower 41 follows immediately causing a high voltage to appear at the positive input of comparator 51. However, the voltage on control capacitor 45 rises more slowly. Consequently, the positive input of comparator 51 is now larger than the negative input and comparator 51 turns on to provide a chipped tool output signal. It is seen that adjustment of potentiometer 53 by the operator selects the magnitude of up-chip differential $s_1$ to be detected. Random transients smaller than this are rejected and do not produce a false output signal.

The chipped tool output signal resulting from a rapid increase in the average cutting tool wear signal is conducted through a diode 70 to the base of an output indication transistor 71, turning it on. Output indication transistor 71 can also be rendered conductive by a chipped tool output signal resulting from a sudden decrease in the averaged tool wear signal conducted through a second diode 72 also connected to the base. Diodes 70 and 72 are forward biased alternatively, of course, to isolate the two parts of the chipped tool detection logic. A normally closed reset switch 73 is connected between the emitter of transistor 71 and a grounded terminal, while the coil 74 of an output relay with three sets of contacts is connected between the collector and a source of voltage +V. A chipped tool output signal therefore turns on transistor 71, energizing output relay coil 74, and closing the three sets of contacts 74a, 74b, and 74c. Contacts 74a are connected directly across the emitter and collector of transistor 71 and have a latching function. The second set of contacts 74b energizes an indicator lamp 75 from a 115 volt, 60 Hz source. The third contacts 74c close a circuit to actuate automatic retraction of cutting tool 12 from the workpiece, or alternatively de-energizes the machine tool. Manual resetting of the chipped tool detection circuit by operating reset switch 73 among other things de-energizes relay coil 74, which discharges through parallel-connected diode 76, and opens the three sets of contacts 74a–74c. Reset switch 73 is connected for joint operation with a second reset switch 73' which serves to discharge capacitor 59 by temporarily connecting this capacitor, resistor 60, and a resistor-capacitor network 76 between grounded terminals.

The chipped tool detection circuit logic for detecting a rapid decrease 32 in the averaged cutting tool wear signal greater than the down-chip differential $s_2$ (FIG. 4) will now be explained. The averaged cutting tool wear signal represented by the voltage on storage capacitor 38 is also fed through a resistor 77 and a blocking diode 78 to a control capacitor 79. The non-inverting input terminal of an operational amplifier 80 is connected directly to the junction of diode 78 and control capacitor 79, these three components functioning as a peak detector with a long hold time. Preferably the same integrated circuit operational amplifier is used in peak detector circuit 80 and voltage follower 41 and 46. To provide a reset for control capacitor 79, a discharge resistor 81 is connected to a terminal 73x of reset switch 73 in such manner that temporarily operating the reset switch connects capacitor 79 between grounded terminals. The output of peak detector circuit 80 is attenuated by a potentiometer 82 and applied through a diode 83 and resistor 84 to the positive input of a comparator circuit 85.

The slowly increasing averaged cutting tool wear signal provided by storage capacitor 38 is simultaneously conducted through a diode 86 to an adjustable delay network comprising a delay capacitor 87 and a pair of resistors 88 and 89, one of which is adjustable, connected in parallel therewith. The delay network delays the averaged cutting tool wear signal by the interval $t_1$ shown in FIG. 4, as determined by the time constant of capacitor 87 and parallel resistors 88 and 89. The delayed tool wear signal is coupled by means of a resistor 90 to the negative input terminal of comparator 85. As the averaged cutting tool wear signal steadily increases, both the positive and negative inputs to comparator 85 increase with the positive smaller than the negative because of attenuator 82. off position so that no chipped tool output signal can occur. Comparator 91 changes state, of course, when the threshold voltage level is exceeded, thereby turning off comparator 91 so that comparator 85 is no longer clamped in the off condition.

The operation of the chipped tool detection logic for detecting a rapid decrease in the tool wear signal will now be reviewed. The voltage on storage capacitor 38 is supplied to a peak detector circuit comprised by diode 78, control capacitor 79, and operational amplifier 80. This peak detector has a relatively long hold time. The output of the peak detector is attenuated by potentiometer To prevent a chipped tool output signal from occurring during the stopping transient 33, and also during the starting transient 29 when the tool wear signal is below the threshold level 35, a second comparator 91 is used. Comparators 91, 85, and 51 are preferably identical integrated circuit components. The positive input terminal of comparator 91 is connected through a resistor 92 to the pointer of a potentiometer 93 which is in turn connected between a source of voltage +V and ground. The threshold voltage level is adjustable by means of the potentiometer 93. The negative input of comparator 91 is connected through a resistor 94 directly to the output of differential amplifier 27. When the cutting tool wear signal is below the threshold level 35, the positive input to comparator 91 is larger than the negative input and an output signal is generated. This output is conducted by a series connected diode 95 and resistor 96 and applied to the negative input terminal of comparator 85. This voltage is larger than the relatively low level delayed tool wear signal appearing at the positive input, and clamps comparator 85 in the 82 and applied to the positive input of comparator 85. One negative input to comparator 85 is the delayed averaged cutting tool wear signal with a delay interval as determined by the time constant of RC network 87–89. As the tool wear signal slowly increases, there is a corresponding increase at both the positive and negative inputs to comparator 85 with the positive and negative being smaller than the negative input because of the attenuator 82. When the averaged cutting tool wear signal suddenly decreases due to a chipped tool by an amount exceeding the down-chip differential $s_2$, the peak value of the signal held by peak detector 80 still appears at the positive input of comparator 85. However, the value at the negative input decreases at a rate determined by the time constant of the delay network 87–89. When it passes through the differential determined by the setting of potentiometer 82, which adjusts the magnitude of $s_2$ to be detected, comparator 85 is actuated and produces a chipped tool output signal. Comparator 91 inhibits the production of an output signal whenever the tool wear signal is below the threshold level 35. This is true during both the starting transient 29 and the stopping transient 33. It is noted that the delay interval $t_1$ (FIG. 4) must be at least as long as it normally takes for the stopping transient 33 to fall from its peak value to the threshold level 35, i.e., the interval $t_2$. This is necessary to reject the stopping transient at the end of each pass when the cutting tool is retracted in the normal course of machining, assuming it is not previously interrupted by a chipped tool output indication or a worn tool output indication.

As was mentioned, a chipped tool output signal from comparator 85 is conducted by diode 72 and turns on output indication transistor 71. This energizes the relay coil 74 and closes the three sets of contacts 74a–74c, lighting the indicator lamp 75 and activating the circuit for retracting the cutting tool. If desired, an automatic cutting tool insert changing mechanism of the type disclosed in U.S. Pat. No. 3,368,265 may be associated with the chipped cutting tool detection system.

In summary, automatic sonic detection of chipped cutting tools is achieved by monitoring a vibration transducer signal containing at least a selected band of frequencies indicative of cutting tool wear. A chipped tool output signal is obtained in response to a rapid increase or decrease in the averaged cutting tool wear signal with provision for rejecting the fast rising and fast falling starting and stopping transients. In combination with a compatible sonic worn cutting tool detection system, there results a complete automatic cutting edge condition monitoring system for automated machining operations.

While the invention has been particularly shown and described with reference to a preferred embodiment thereof, it will be understood by those skilled in the art that various changes in form and details may be made therein without departing from the spirit and scope of the invention.

What we claim as new and desire to secure by Letters Patent of the United States is:

1. A chipped cutting tool detection system comprising
    means for sensing the vibrations of a cutting tool during a machining operation and generating an averaged cutting tool wear signal with a slowly changing amplitude as the tool wears,
    chippped tool detection circuit means for rejecting transients in said averaged tool wear signal and for producing a chipped tool output signal in response to rapid increases and decreases in said slowly changing tool wear signal caused by chipping of the cutting tool, and
    output means for indicating the occurrence of a chipped tool, wherein
    said chipped tool detection circuit means comprises a pair of independently operating circuit sections for respectively detecting the rapid increases and rapid decreases in said averaged tool wear signal, said averaged tool wear signal being supplied in parallel to said pair of circuit sections.

2. A system according to claim 1 wherein said detection circuit sections respectively produce said chipped tool output signal only when the rapid increases and decreases in said averaged tool wear signal exceed predetermined magnitudes.

3. A chipped cutting tool detection system comprising
    a vibration transducer for sensing the vibrations of a cutting tool during a machining operation, and an associated frequency selective circuit for generating an averaged cutting tool wear voltage signal, said tool wear signal having a slowly increasing amplitude with greater tool wear and a fast rising starting transient and a fast falling stopping transient,
    a first chipped tool detection circuit for rejecting said starting transient and for producing a first chipped tool output signal in response to detecting a rapid increase in said slowly increasing averaged tool wear signal caused by chipping of the cutting tool, a second chipped tool detection circuit for rejecting said stopping transient and for producing a second chipped tool output signal in response to detecting a rapid decrease in said slowly increasing averaged tool wear signal caused by chipping of the cutting tool, said averaged tool wear signal being fed to said first and second chipped tool detection circuits in parallel, and output means actuated by either chipped tool output signal for indicating the occurrence of a chipped tool.

4. A system according to claim 3 wherein said first chipped tool detection circuit rejects at least the portion of said starting transient below a selected threshold signal level, and said second chipped tool detection circuit rejects the portion of said stopping transient below the selected threshold signal level, and has a predetermined delay between said rapid decrease and the production of said second chipped tool output signal sufficient for said stopping transient to decay below said threshold level.

5. A system according to claim 4 wherein said threshold signal level is adjustable and said predetermined delay is adjustable, and said first and second chipped tool detection circuits respectively produce said chipped tool output signals only when the rapid increases and decreases in said averaged tool wear signal exceed predetermined adjustable magnitudes.

6. A system according to claim 3 wherein said first chipped tool detection circuit comprises a first voltage follower to which said averaged tool wear signal is supplied, a second voltage follower controlled by the voltage on a control capacitor that approximates said averaged tool wear signal except when said starting transient is below a predetermined threshold level, a bistable circuit connected to sense the output of said first voltage follower and change state at said threshold level, a pair of control capacitor charging circuits effectively controlled by said bistable circuit for charging said control capacitor at a first rate below said threshold level and a slow rate above said threshold level, and a comparator that produces said first chipped tool output signal when the output of said second voltage follower exceeds the attenuated output of said first voltage follower.

7. A system according to claim 3 wherein said second chipped tool detection circuit comprises a peak detector circuit with a long hold period to which said averaged tool wear signal is supplied, a delay circuit for delaying said averaged tool wear signal, a first comparator that produces an output only when said averaged tool wear signal is less than a predetermined threshold signal level, and a second comparator that produces said second chipped tool output signal when the attenuated output of said peak detector circuit exceeds the output of said delay circuit and the output of said first comparator.

8. A chipped cutting tool detection system comprising means for sensing the vibrations of a cutting tool during a machining operation and generating an averaged cutting tool wear signal with a slowly changing amplitude as the tool wears, a chipped tool detection circuit including means for rejecting transients in said averaged tool wear signal and means for producing a chipped tool output signal in response to rapid increases and decreases in said slowly changing tool wear signal caused by a substantially duller or sharper chipped cutting tool edge, and output means for indicating the occurrence of a chipped tool.

9. A system according to claim 8 wherein said means for rejecting transients rejects both a fast rising starting transient and a fast falling stopping transient in said averaged tool wear signal.

10. A system according to claim 8 wherein said means for rejecting transients rejects any portion of said transients in said tool wear signal below a preselected adjustable threshold amplitude level, and said means for producing a chipped tool output signal includes a predetermined adjustable delay between the rapid increase in said tool wear signal and the production of said chipped tool output signal sufficient for said transients to decay below said preselected threshold level.

* * * * *